(12) United States Patent
Kosanke

(10) Patent No.: US 8,132,544 B2
(45) Date of Patent: Mar. 13, 2012

(54) CAT HARNESS

(75) Inventor: Tobi Kosanke, Hempstead, TX (US)

(73) Assignee: Crazy K Poultry and Livestock, LLC, Hempstead, TX (US)

( * ) Notice: Subject to any disclaimer, the term of this patent is extended or adjusted under 35 U.S.C. 154(b) by 219 days.

(21) Appl. No.: 12/430,472

(22) Filed: Apr. 27, 2009

(65) Prior Publication Data

US 2010/0147230 A1    Jun. 17, 2010

Related U.S. Application Data

(60) Provisional application No. 61/122,376, filed on Dec. 13, 2008.

(51) Int. Cl.
*A01K 27/00* (2006.01)

(52) U.S. Cl. ........................................ 119/856

(58) Field of Classification Search ............... 119/856, 119/907, 792, 857; D30/152
See application file for complete search history.

(56) References Cited

U.S. PATENT DOCUMENTS

| | | | |
|---|---|---|---|
| 3,769,939 A | 11/1973 | Wais et al. | |
| 4,964,369 A | 10/1990 | Sporn | |
| 5,009,196 A | 4/1991 | Young | |
| 5,941,199 A | 8/1999 | Tamura | |
| 6,101,979 A | 8/2000 | Wilson et al. | |
| 6,443,101 B1* | 9/2002 | Fazio | 119/792 |
| 6,571,745 B2 | 6/2003 | Kerrigan | |
| 6,662,755 B2 | 12/2003 | Kato | |
| 6,694,923 B1 | 2/2004 | Fouche | |
| 7,325,516 B2* | 2/2008 | Moore | 119/850 |
| 2005/0217609 A1* | 10/2005 | Dorton et al. | 119/792 |
| 2005/0229869 A1* | 10/2005 | Leo | 119/850 |
| 2006/0065210 A1* | 3/2006 | Tozawa | 119/863 |
| 2007/0039560 A1 | 2/2007 | Smith | |
| 2008/0047501 A1 | 2/2008 | Madere et al. | |
| 2008/0134991 A1* | 6/2008 | DePass | 119/856 |
| 2010/0024744 A1* | 2/2010 | Baillie | 119/855 |
| 2010/0263602 A1* | 10/2010 | Cho | 119/792 |

* cited by examiner

*Primary Examiner* — Kristen Hayes
(74) *Attorney, Agent, or Firm* — Maybeck & Hoffman, PA; Gregory L. Maybeck; Katie M. Blarley

(57) ABSTRACT

A cat harness includes a unitary piece of material with a shape that has a central spine portion with a length and a width, where the width is at least about 60% of the length, a waistband extending generally perpendicular to an imaginary longitudinal line passing along the length of the central spine portion and a collar extending from the central spine portion at an acute angle to an extent of the imaginary longitudinal line passing along the length of the central spine portion. The cat harness also includes an attachment loop coupled to the central spine portion.

17 Claims, 6 Drawing Sheets

CAT HARNESS

CROSS-REFERENCE TO RELATED APPLICATION

This application claims the priority, under 35 U.S.C. §119, of U.S. Provisional Patent Application Ser. No. 61/122,376 filed Dec. 13, 2008, the entire disclosure of which is hereby incorporated herein by reference in its entirety.

FIELD OF THE INVENTION

The present invention relates generally to harnesses for animals, and more particularly relates to a unitary clothing-like harness that can be worn by an animal, such as a cat, to provide control and restraint of the animal.

BACKGROUND OF THE INVENTION

Domestic cats, next to dogs, are the most commonly-owned pet today. It is estimated that domestic cats, in contrast to other felines and felids, have been associated with humans for at least 9,500 years. Although they are commonly referred to as "house" cats, many of these cats run free in the outdoors. Others simply enjoy visiting the outdoors from time to time.

Cats that run free are at risk for injury and death from moving cars, other animals, getting lost, or many other dangers that exist outdoors. Cats are also exposed to many of these same risks, and more, during times of travel. For at least this reason, many have attempted to protect cats by providing a harness that attaches to cat and to a leash.

A properly fitting, comfortable harness that is acceptable by the cat can provide a way of safely controlling, securing, and restraining the cat during times of travel, on outdoor walks, in unfamiliar surroundings, in risky settings, such as unscreened terraces or balconies, and in most any environment a person wishes to be able to control or restrain their cat.

Current harnesses on the market are typically assembled of narrow strips of material, are often made specifically for dogs, are not constructed of lightweight materials, and are not designed to be stylish, comfortable, or clothing-like. Most of these known cat harnesses have a figure "8" or "H" type shape to them, with one loop securing the cat's neck and the other going around the animal's stomach. Attaching a leash to such harnesses most often meets with resistance from the cat. In fact, for a reason that isn't completely understood, many cats go into a state of virtual panic when an "8" or "H" type restraint is placed on them. Their reaction is to remain completely motionless for extensive periods of time, to lay down, to struggle to remove it, to cry, and/or to increase their heart rate.

Therefore, a need exists to overcome the problems with the prior art as discussed above.

SUMMARY OF THE INVENTION

Briefly, in accordance with the present invention, disclosed is a cat harness that includes a unitary piece of material with a shape that has a central spine portion with a length and a width, where the width is at least about 60% of the length, a waistband extending generally perpendicular to an imaginary longitudinal line passing along the length of the central spine portion and a collar extending from the central spine portion at an acute angle to an extent of the imaginary longitudinal line passing along the length of the central spine portion. The cat harness also includes an attachment loop coupled to the central spine portion.

In accordance with another feature, an embodiment of the present invention includes a fastener coupled to the waistband and capable of securing a first waistband portion to a second waistband portion, thereby forming a closed loop.

In accordance with a further feature of the present invention, the waistband has a width of about 50% or more of the width of the central spine portion.

In accordance with yet another feature of the present invention, the collar has a width of about 30% or more of the width of the central spine portion.

In accordance with an additional feature of the present invention, the collar includes a first waistband portion extending from the central spine portion in a first direction and has a first fastener portion and a second waistband portion extends from the central spine portion in a second direction and has a second fastener portion, wherein the first fastener portion and the second fastener portion are capable of securing the first waistband portion to the second waistband portion, thereby forming a closed loop.

In accordance with a further feature, the present invention includes a first waistband portion extending from the central spine portion in a first direction and having a first fastener portion and a second waistband portion extending from the central spine portion in a second direction and having a second fastener portion, wherein the first fastener portion and the second fastener portion are capable of securing the first waistband portion to the second waistband portion, thereby forming a closed loop.

In accordance with another feature, an embodiment of the present invention also includes a fastener coupled to the collar and capable of securing a first collar portion to a second collar portion, thereby forming a closed loop.

Although the invention is illustrated and described herein as embodied in a comfortable clothing-like cat harness, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which, together with the detailed description below, are incorporated in and form part of the specification, serve to further illustrate various embodiments and to explain various principles and advantages all in accordance with the present invention.

FIG. 1 is a planar top view of a cat harness in a flattened-out orientation in accordance with the present invention;

DETAILED DESCRIPTION

Figure 2:
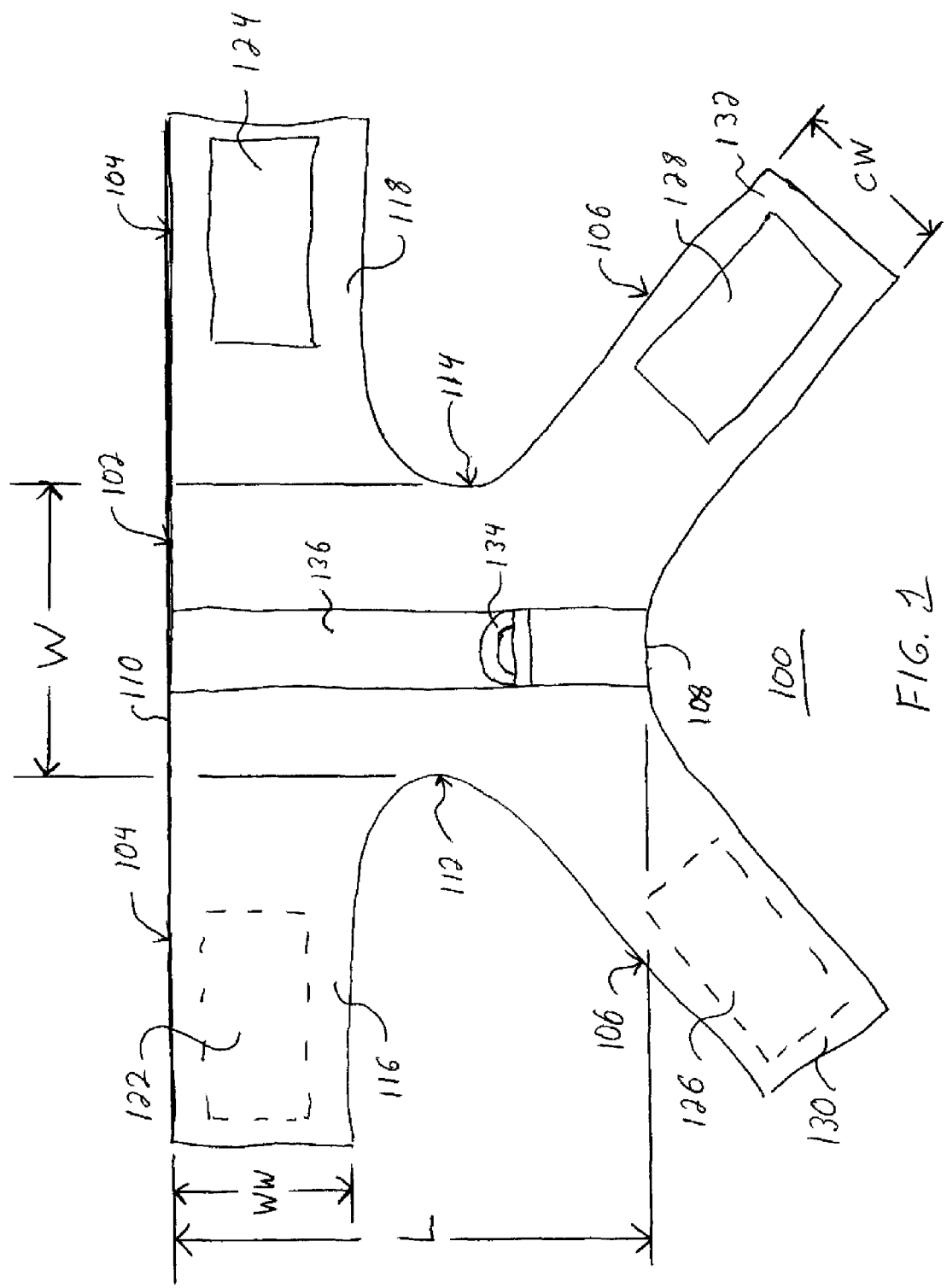
FIG. 2 is a planar bottom view of the cat harness of FIG. 1 showing longitudinal lines for reference.
Figure 2:
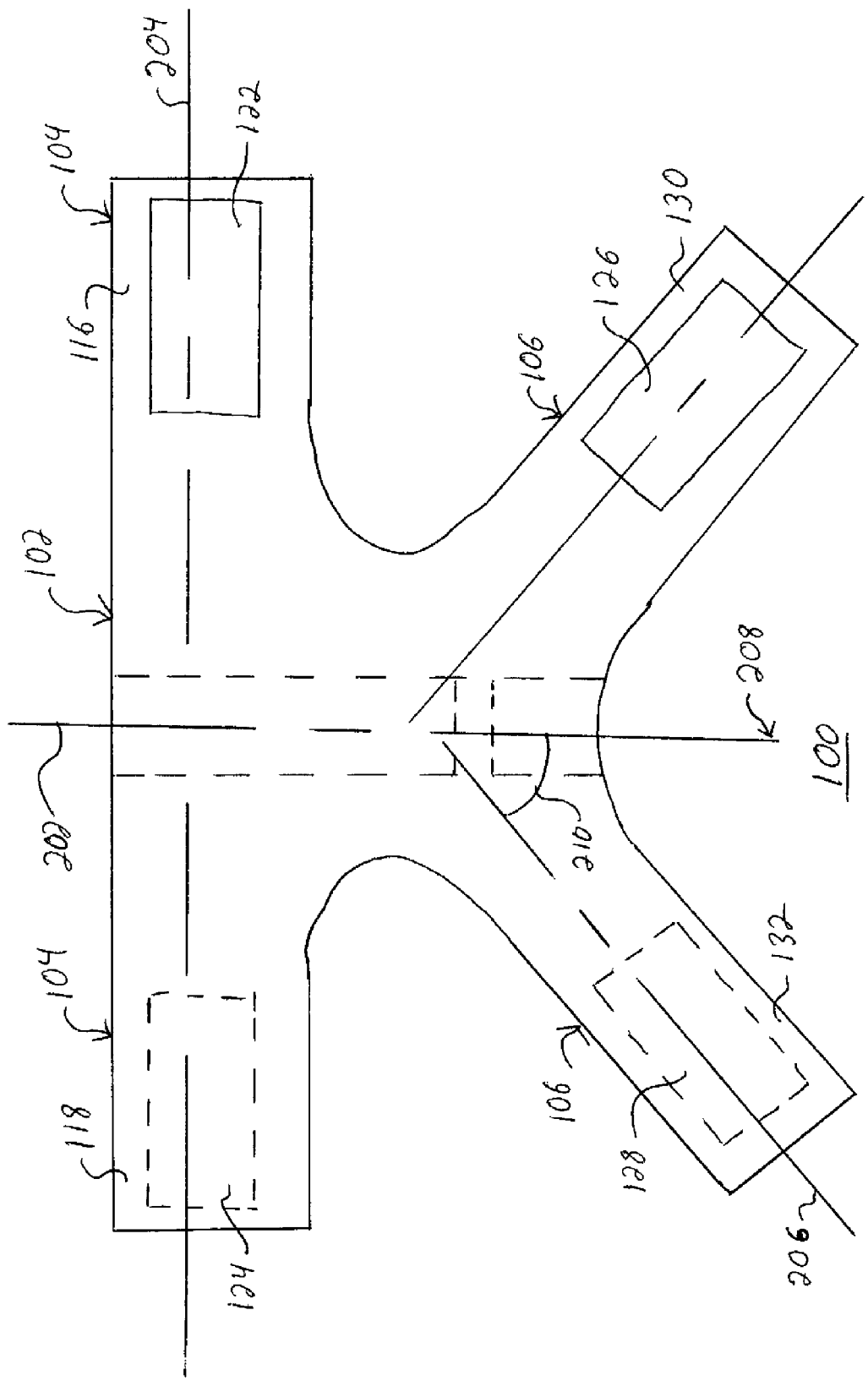

The present invention provides a novel cat harness that, according to certain embodiments, is constructed of multiple layers of soft material. The wide, soft, and lightweight harness is comfortable for a cat to wear while providing safety and security for the cat. The clothing-like harness is secured on the cat with soft, flexible fasteners. This stylish cat harness can be constructed from a variety of soft materials, and in practically an unlimited range of colors and patterns to permit cat owners to select a color or pattern that they feel looks best on their cat and/or which most accurately reflects either the cat's or the owner's personality.

Referring now to FIG. 1, one exemplary embodiment of the present invention is shown. FIG. 1 illustrates several advantageous features of the present invention, but, as will be described below, the invention can be provided in several shapes, sizes, combinations of features and components, and varying numbers and functions of the components. In this first embodiment of FIG. 1, the inventive cat harness 100 is shown from a planar top view in a flattened-out orientation. Generally speaking, the harness 100 includes three main parts: a central spine portion 102; a waistband 104 (which can include multiple parts); and a collar 106 (which can include multiple parts). The central spine portion 102 is the portion of the harness 100 that is placed over and covers at least part of the cat's back. The central spine portion 102 has length L and width W. The length L is generally defined by a front edge 108 and rear edge 110. The Width W is generally, although not necessarily, defined, by the separation of two inner curves 112, 114 that are formed by and between portions of the waistband 104 and collar 106.

One advantage of the present invention is the clothing-like appearance and feel that is provided to the cat. In each of the contemplated embodiments, the width W of the central spine portion 102 is reasonably wide enough to not be comparable to and/or feel like the thin straps present in prior-art harnesses. For this reason, the width W is generally dimensioned to be at least 60% or more of the length dimension L.

Also in FIG. 1, it can be seen that the waistband 104 is formed from two waistband straps 116, 118. Each of the waistband straps 116, 118 supports one of two waistband fastener parts 122, 124. The two waistband fastener parts 122, 124 can be a hook and loop, such as VELCRO, snaps, button and loop, and other similar fastening devices. When secured together by the waistband fastener parts 122, 124, the waistband fastener straps 116, 118 form a loop that can be used to secure the harness 100 around the abdomen of a cat or other animal.

Likewise, the collar 106 is formed from two collar straps 130, 132. Each of the collar straps 130, 132 supports one of two collar fastener parts 126, 128. The two collar fastener parts 126, 128 can also be a hook and loop, such as VELCRO, snaps, button and loop, and others similar fastening devices. When secured together by the two collar fastener parts 130, 132, the two collar straps 130, 132 form a loop that can be used to secure the harness 100 to the neck of a cat.

To provide the comfortable and securing feel to the animal wearing the harness 100, in one embodiment, the waistband 104 has an average width WW of about 50% or more of the width W, as defined above, of the central spine portion 102. Similarly, according to one embodiment of the present invention, the collar 106 has an average width CW of about 30% or more of the width W, as defined above, of the central spine portion 102.

FIG. 1 also shows a loop 134 that is securely attached to the upper surface of the harness 100 and, in particular, to the central spine portion 102. The loop 134 can have a circle shape, square shaped, or any other shape that provides a location to secure a leash to the harness 100. Once attached, the leash prevents the cat or other animal wearing the harness 100 from straying more than a fixed distance from the person holding the leash. The loop 134 can be made of various materials that are, preferably, but not necessarily, strong and rigid, such as, but not limited to, metal and plastic.

A spine cover 136 is attached to the central spine portion 102 by sewing gluing, snapping, hook and loop closures, or others. The spine cover 136 can be made of various materials, such as, but not limited to, denim, canvas duck, leather, nylon, and cotton. The loop 134 is, in one embodiment, sewn onto or partially trapped under the spine cover 136, but can be secured in various other ways, such as, but not limited to, snaps, button, hook and loop closures.

FIG. 2 shows a planar bottom view of the harness 100 in a flattened-out orientation. As is shown in both FIG. 1 and FIG. 2, the inventive harness 100 is a unitary piece of material, meaning that the waistband portions 116, 118, the collar portions 130, 132, and central spine section 102 are all physically and securely coupled to one another. The orientation of the waistband 104 and collar 106 can be defined in terms of angles from an imaginary longitudinal line 202 passing through the central spine portion 102. Specifically, an imaginary longitudinal line 204 passing through the waistband 104 extends generally perpendicular to the imaginary longitudinal line 202 passing through the central spine portion 102. Further, at least one portion 130, 132 of the collar 106 has an imaginary longitudinal line 206 that extends from the central spine portion 102 at an acute angle 210 to one extent 208 of the imaginary longitudinal line 202 passing through the central spine portion 102.

Figure 3:
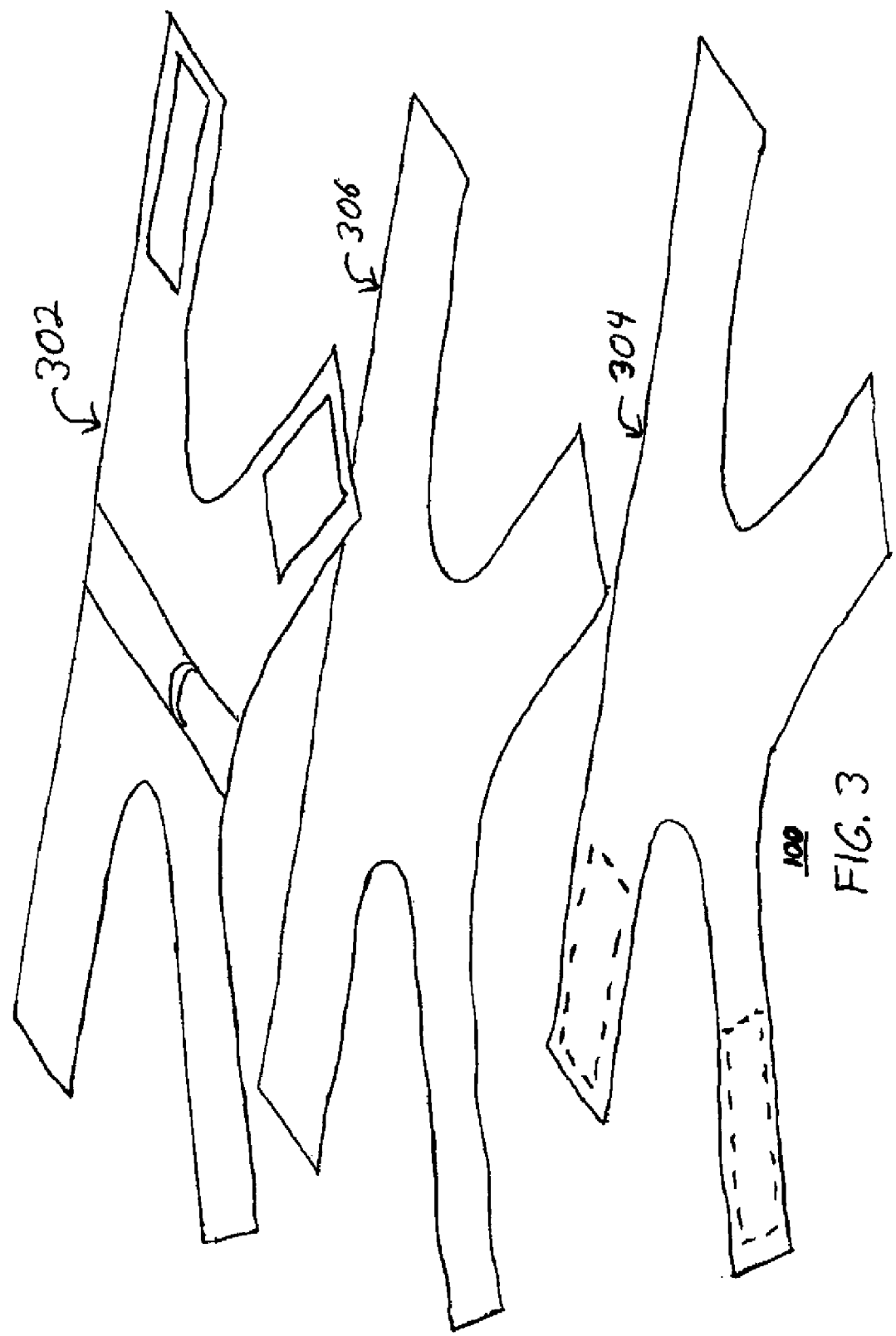
FIG. 3 is an exploded perspective view of the cat harness of FIGS. 1 and 2.

The perspective view of FIG. 3 shows that, according to one embodiment of the present invention, the inventive cat harness 100 can be made of multiple layers of material that includes an upper layer 302 and an under layer 304, both layers preferably being soft, lightweight, and flexible materials, such as, but not limited to, one or more top and bottom layers of cotton, cotton-blend, denim, canvas duck, leather, rayon, nylon, a combination thereof, and other similar materials. The harness 100 can also include a middle layer of batting 306 that can be of various breathable materials, such as, but not limited to, cotton.

The construction of the harness 100 using multiple layers of soft and lightweight material is agreeable to a large majority of cats who reject other types of harnesses. The result is clothing-like and conducive to being provided in a wide variety of colors and patterns to permit cat owners to select a color or pattern that they feel looks best on their cat and/or which most accurately reflects either their cat's or their own personality. The layers 302, 304, and 306 can be secured to one another by sewing, gluing, or other suitable attachments modes.

Figure 4:
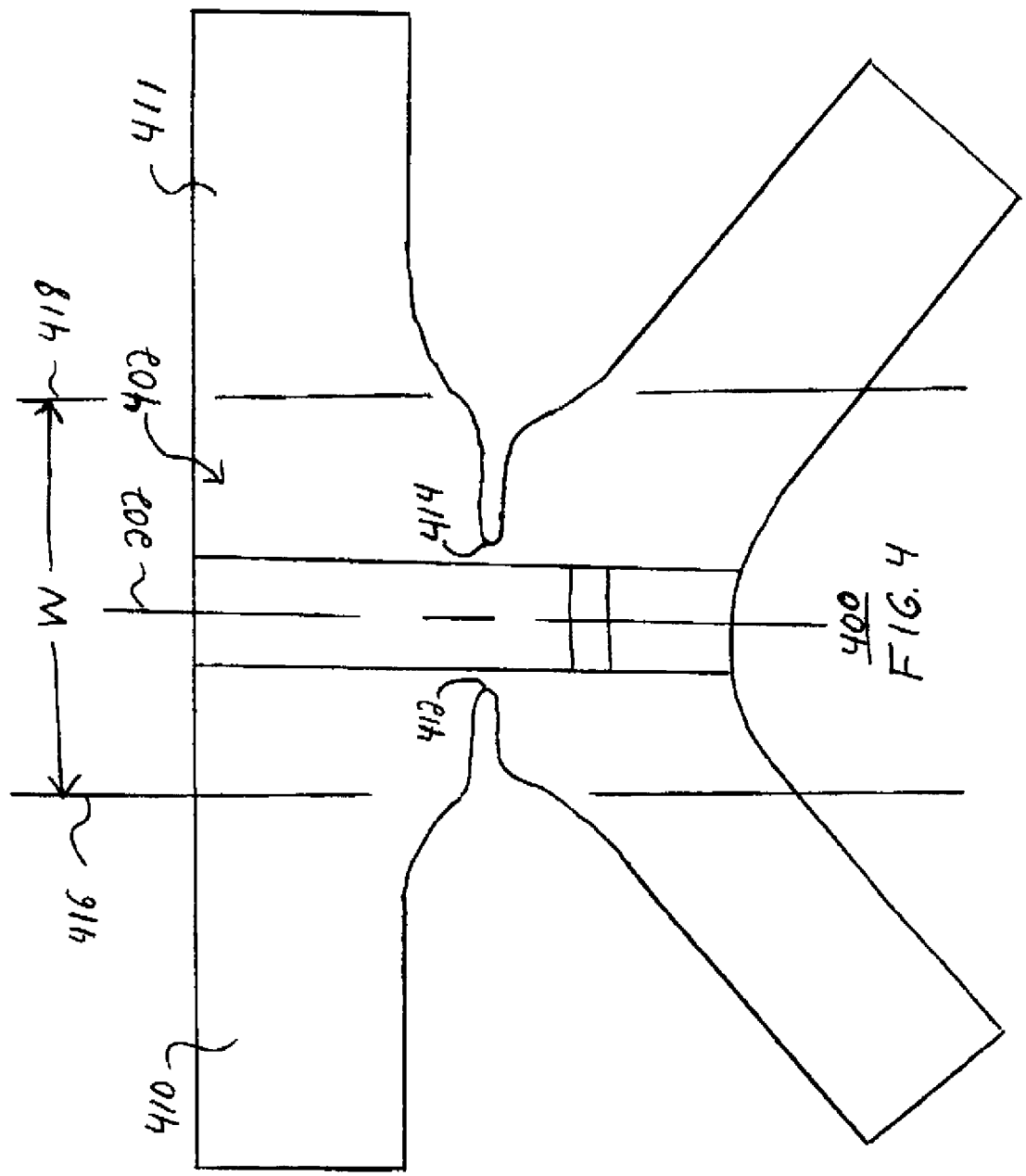
FIG. 4 is a planar top view of a cat harness in a flattened-out orientation in accordance with the present invention.

Some shapes of the harness, such as that shown in FIG. 4, may provide curves 412, 414 or other similar cut-outs that cut in closer to the central longitudinal line 202 of the central spine portion 402. In this case, the cut-in curves 412, 414 are small enough of a percentage of the overall amount of material that they do not negatively affect the clothing-like appearance and feel of the harness 400. In this case, the width W is not defined as the distance between two curves 412, 414, as was the case for the embodiment shown in FIG. 1, but will, instead, be defined as a distance between two imaginary lines 416, 418 where the waistband portions 410, 411 complete a transition from the central spine portion 402 to the waistband portions 410, 411.

Figure 5:
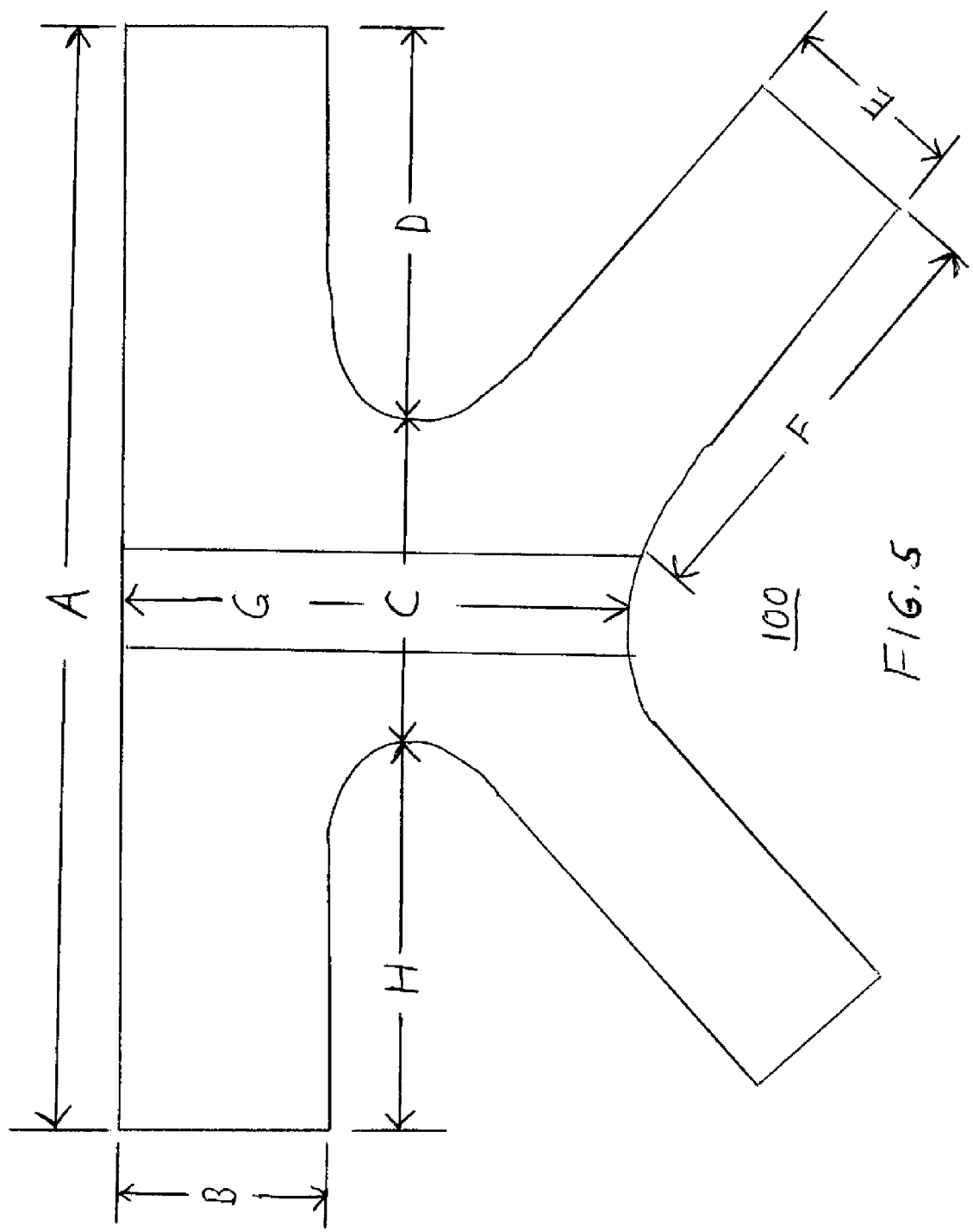
FIG. 5 is a planar top view of a cat harness in a flattened-out orientation with dimensions labeled in accordance with the present invention.

FIG. 5 provides exemplary dimensions of the presently inventive harness 100. According to one embodiment, possibly for a larger-sized cat, the dimensions are as follows:
A: 23"
B: 3"
C: 7"
D: 7½"
E: 3¾"
F: 7"
G: 8½"
H: 8½"

According to a second embodiment of the present invention, possibly suited for a smaller-size cat, the dimensions, as shown in FIG. 5, can be as follows:
A: 21"
B: 3½"
C: 6"
D: 7"
E: 2¼"
F: 6"
G: 8"
H: 8"

The invention, however, is not limited to any specific dimensions. For clarity and understanding, however, the following ranges of dimensions are provided to give exemplary measurements that can be utilized for sizing the present invention for proper fit on a variety of animals.
A: 19"-25"
B: 3"-5"
C: 5"-8"
D: 10"-13½"
E: 1¾"-3¼"
F: 5"-8"
G: 6½"-9½"
H: 9"-11½"

Figure 6:
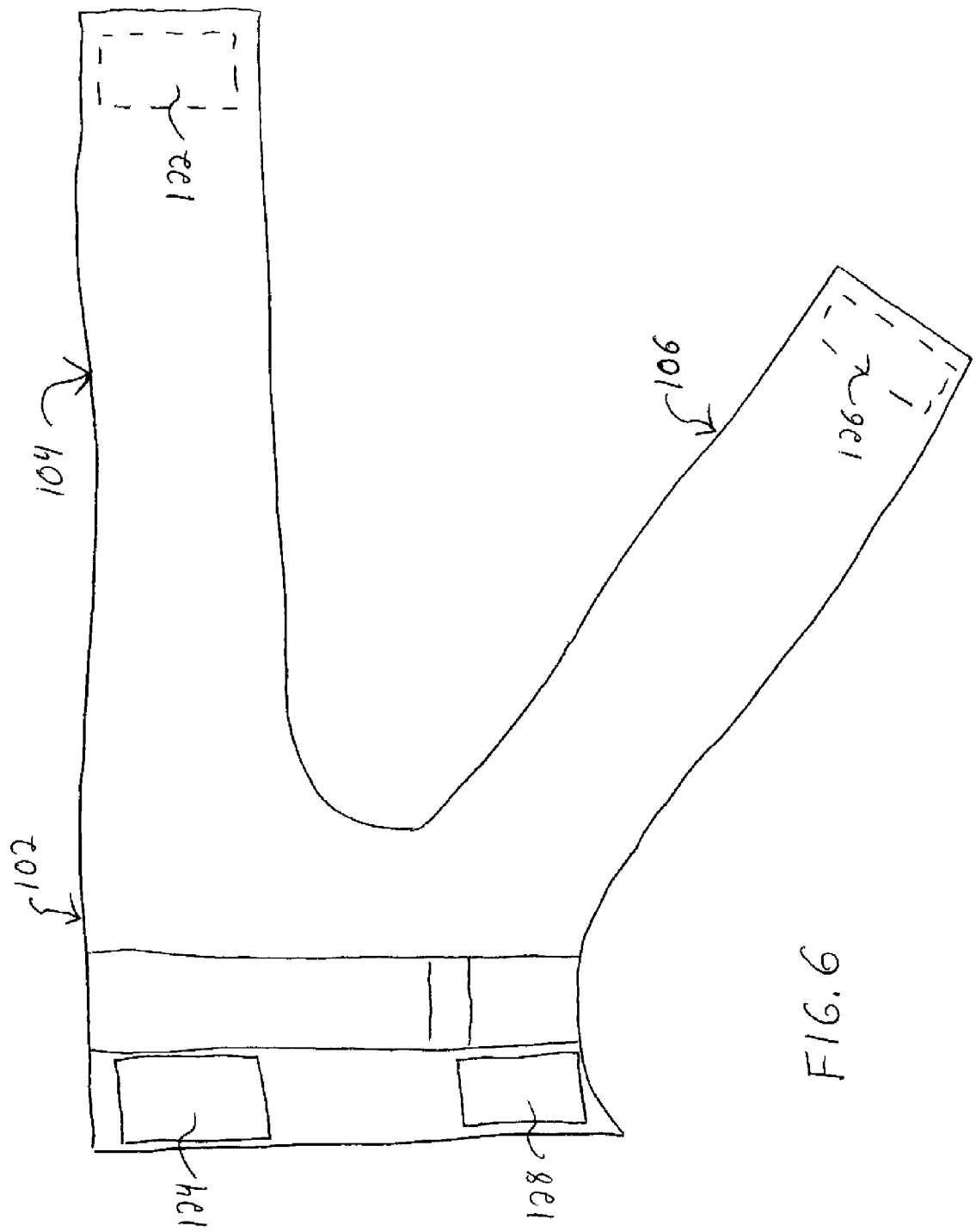
FIG. 6 is a planar top view of an alternative embodiment of the cat harness in accordance with the present invention.

FIG. 6 shows an alternative embodiment of the inventive cat harness in accordance with the present invention. In the embodiment of FIG. 6, the waistband 104 and the collar 106 are single pieces, as opposed to the multiple-piece waistband and collar shown in FIGS. 1-5.

The present invention provides a wide, soft, and lightweight cat harness 100 that is comfortable for cats to wear while providing safety and security for the cat in unfamiliar surroundings. The clothing-like harness 100 is secured on the cat with soft, strong, flexible fasteners 122, 124, 126, 128. The stylish cat harness 100 can be constructed from a variety of soft materials, and in practically an unlimited range of colors and patterns to permit cat owners to select a color or pattern that they feel looks best on their cat and/or which most accurately reflects either the cat's or owner's personality.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings, and the claims.

What is claimed is:

1. A cat harness, comprising:
a unitary piece of material having a shape that includes:
a central spine portion having a length defining a longitudinal axis and a width region defined by a first curved outer edge and an opposing second curved outer edge;
a waistband extending from the central spine portion generally perpendicular to the longitudinal axis; and
a collar extending from the central spine portion at an acute angle to an extent of the longitudinal axis,
the width region of the central spine portion having:
a first width extending between the opposing first and second curved outer edges at a region where the waistband extends from the central spine portion; and
a second width smaller than the first width, the second width extending between first and second cut-out portions formed in the first width, the first cut-out portion being defined by a first cut made in the first curved outer edge and extending in a direction toward the longitudinal axis, the second cut-out portion being defined by a second cut made in the opposing second curved outer edge and extending in a direction toward the longitudinal axis.

2. The cat harness according to claim 1, wherein the first cut-out portion is aligned with the second cut-out portion such that the first and second cut-out portions oppose one another.

3. The cat harness according to claim 1, wherein the waistband has a third width of at least approximately 50% of the first width of the central spine portion.

4. The cat harness according to claim 1, wherein the collar has a fourth width of at least approximately 30% of the first width of the central spine portion.

5. The cat harness according to claim 1, further comprising:
   a first fastener coupled to the waistband and capable of securing a first waistband portion to a second waistband portion, thereby forming a closed loop.

6. The cat harness according to claim 1, further comprising an under layer physically coupled to and substantially of the same dimensions as the unitary piece of material.

7. The cat harness according to claim 6, further comprising batting material sandwiched between and contained by the under layer and the unitary piece of material.

8. The cat harness according to claim 1, wherein the waistband comprises:
   a first waistband portion extending from the central spine portion in a first direction and having a first fastener portion; and
   a second waistband portion extending from the central spine portion in a second direction and having a second fastener portion,
   wherein the first fastener portion and the second fastener portion are capable of securing the first waistband portion to the second waistband portion, thereby forming a closed loop.

9. The cat harness according to claim 1, further comprising:
   a fastener coupled to the collar and capable of securing a first collar portion to a second collar portion, thereby forming a closed loop.

10. The cat harness according to claim 1, wherein the collar comprises:
    a first collar portion extending from the central spine portion in a first direction and having a first fastener portion; and
    a second collar portion extending from the central spine portion in a second direction and having a second fastener portion,
    wherein the first fastener portion and the second fastener portion are capable of securing the first collar portion to the second collar portion, thereby forming a closed loop.

11. The cat harness according to claim 1, wherein the length of the central spine portion is between about 6.5 inches and about 8.5 inches long.

12. The cat harness according to claim 1, wherein the first width of the central spine portion is between about 5 inches and about 7 inches wide.

13. The cat harness according to claim 1, wherein the waistband includes:
    a waistband length of between about 19 inches and about 23 inches long; and
    a waistband width of between about 3 inches and about 3.5 inches wide.

14. The cat harness according to claim 1, wherein the collar comprises a first and a second strap, each having:
    a collar length of between about 5 inches and about 7 inches; and
    a collar width of between about 1.75 inches and about 3.75 inches wide.

15. The cat harness according to claim 1, wherein the first and second cuts are U-shaped cuts made in the respective first and second curved outer edges.

16. The cat harness according to claim 1, wherein the first width of the central spine portion is at least approximately 60% of the length.

17. The cat harness according to claim 1, further comprising an attachment loop coupled to the central spine portion.

\* \* \* \* \*